United States Patent Office 2,704,246
Patented Mar. 15, 1955

2,704,246

ISOPARAFFINIC HYDROCARBONS AS CARRIERS FOR CHEMICALS WHICH AFFECT PLANTS

Lyle D. Goodhue, Bartlesville, Okla., and Carolyn E. Tissol, Minneapolis, Minn., assignors to Phillips Petroleum Company, a corporation of Delaware No Drawing. Application January 30, 1951,
Serial No. 208,654

17 Claims. (Cl. 71—2.7)

This invention relates to the treatment of plants with agents which affect them. For example, agents which affect plants and with which this invention is concerned are plant defoliants, growth retarders, growth accelerators, anti-sprouting agents, fruit drop and anti-fruit drop agents, fruit setting agents, fruit ripening agents, root formation agents, and pre-emergence sprays, selective herbicides and the like. In one of its aspects the invention relates to a novel composition including at least one agent for one of the above mentioned applications or uses. In another aspect the invention relates to a method of treating a plant in one of said applications to secure improved results. In still another of its aspects the invention relates to the provision of a carrier material having a very high spreading power which enables the said agents efficiently and desirably to affect the plants.

Many substances are applied to plants for the purpose of affecting growth or the like thereof. These substances oftentimes have violent and uncontrollable reactions if applied in high concentrations over local areas, that is, in a spotty manner. Such spotty application is usually obtained when plant affecting agents are applied in carriers having poor spreading and wetting properties such as water, kerosene, diesel fuel, fuel oil and the like. Compositions containing these carriers are usually applied as sprays and hit plant surfaces and remain thereon as small droplets which do not spread to cover the entire plant surface. Localized burning and in many instances severe plant injury is caused by such application.

When applying chemicals to plants, it is desirable to have the application of said chemicals as uniform as possible over the entire plant surface. Uniform coverage, especially of leaf surfaces, provides increased chemical absorption and improved results over application which is highly concentrated over local areas. Uniform coverage affords controlled effects such as defoliation, fruit setting, growth acceleration, and the like.

It has now been found that certain isoparaffinic hydrocarbons are novel and particularly advantageous carriers for chemicals which affect plants. They spread and cover large areas of plant surface, especially leaf surface, per unit of hydrocarbon. They spread to provide films of almost molecular thickness. They carry the active chemical uniformly over a broad plant area thus providing maximum coverage with minimum amount of chemical. These materials are substantially non-phytotoxic and are therefore advantageous where an inert carrier is required.

The novel carriers of the present invention are highly branched isoparaffinic hydrocarbons containing from 9 to 20 carbon atoms. These compounds boil in the range of 260° to 700° F. The carriers of the present invention contain a minimum of 90 per cent isoparaffin hydrocarbons by weight and are substantially completely saturated. As impurities they contain predominantly straight chain saturated hydrocarbons. The presence of more than about 2 weight per cent of cycloparaffins, aromatics or olefins will cause undesirable burning effects to plant surfaces to which applied and in many instances, especially where a non-phytotoxic carrier is required, will minimize the desired results. The carriers of the present invention usually comprise isoparaffinic fractions having a desired boiling range and will usually be composed of one or more isoparaffins containing from 9 to 20 carbon atoms of which at least two are tertiary or quaternary carbon atoms. Typical highly-branched isoparaffins which may comprise said fractions include 2,2,4,4-tetramethylpentane, 2,3-dimethylheptane, 2,4-dimethylheptane, 2,2,3-trimethylhexane, 2,2,4-trimethylhexane, 2,3,-3,4-tetramethylpentane, 2,2,4,4-tetramethylheptane, 2,2,3-trimethyldecane, 2,2,4,4-tetramethyldodecane, 2,3,3,4-tetramethyltridecane, 2,2,4,4-tetramethylhexadecane, and the like. These materials may be obtained from any suitable source. Convenient methods for their preparation include alkylation of isoparaffins with monoolefins using such catalysts as hydrogen fluoride, aluminum chloride, sulfuric acid or the like.

As stated, the carriers of the present invention are advantageously useful for the application of plant defoliants, growth retarders, growth accelerators, anti-sprouting agents, fruit drop and anti-fruit drop agents, fruit setting agents, fruit ripening agents, root formation agents, pre-emergence sprays, selective herbicides and the like.

The materials listed below were used in the tests described in the following examples. They are described completely and will be referred to in the examples by the shorter designation:

| Description | Example Designation |
|---|---|
| 1. Soltrol 140, an isoparaffinic hydrocarbon fraction boiling in the range 368° to 403° F. obtained from reaction product of alkylation of isobutane with mixed butenes in the presence of HF at about 90°-100° F. (temp. can range from 75 to 125° F.). | Soltrol 140. |
| 2. Diisopropyl heavy ends, an isoparaffinic hydrocarbon fraction boiling in the range 324°-637° F. Tag closed cup flash point 110° F., NPA color 1.5, chlorine content 0.1%, aniline point 180° F. Contains a minimum of 90% of isoparaffinic hydrocarbons. Prepared by the aluminum chloride catalyzed alkylation of isobutane with ethylene. | Diisopropyl heavy ends. |
| 3. HF heavy alkylate, an isoparaffinic hydrocarbon fraction boiling in the range 384°-522° F. Contains a minimum of 98% of isoparaffinic hydrocarbons. Prepared by the hydrogen fluoride catalyzed alkylation of isobutane with ethylene. | HF heavy alkylate. |
| 4. Okmulgee diesel fuel. A typical diesel fuel having an API gravity of 39.2 and a boiling range of 361° to 655° F., 31% paraffins, 58% naphthenes, and 11% aromatics. | Diesel Fuel. |
| 5. Okmulgee No. 1 fuel oil. A typical No. 1 fuel having an ASTM boiling range of 400° to 560° F., 25% paraffins, 60% naphthenes, and 15% aromatics. This material has an octane number of 30 or less indicating that the paraffins present are predominantly straight-chain. | No. 1 Fuel Oil. |
| 6. Aromatic gas oil. A highly aromatic recycle gas oil having a boiling range of 404° to 664° F., an API gravity of 21, Tag closed cup flash point of 170° F., NPA color 4, pour point −20° F., Saybolt viscosity 361, aniline point 70° F., diesel index 14.7. | Recycle gas oil. |

EXAMPLE I

The spreading characteristics of 3 isoparaffinic hydrocarbon fractions and No. 1 fuel oil, diesel fuel and recycle gas oil were determined by application of measured amounts of the test materials to cotton leaves. Results of said tests are recorded in the following table.

*Table I*

| | Drop Weight, mg. | Area of Spread, sq. in. | Surface Tension, dynes/cm. | Viscosity, centistokes |
|---|---|---|---|---|
| Soltrol-140 | 3.1 | 1.25 | 26.3 | 1.61 |
| Diisopropyl heavy ends | 2.8 | 1.00 | 25.8 | 1.46 |
| HF heavy alkylate | 3.9 | .90 | 27.5 | 2.20 |
| No. 1 fuel oil | 3.8 | .02 | 28.9 | 1.70 |
| Diesel fuel | 3.7 | .02 | 30.7 | 3.04 |
| Recycle gas oil | 2.5 | .02 | 32.4 | 1.74 |

Results of the tests show that Soltrol 140 has greatest spreading power of the hydrocarbons tested. In all cases, the isoparaffinic hydrocarbon fractions had much greater spreading power than No. 1 fuel oil, diesel fuel or recycle gas oil.

EXAMPLE II

The spreading characteristics of the hydrocarbons of Example I were determined on cotton, beans and Kalanchöe. Results of the test are listed in the following table.

Table II

| Oil | Drop Weight, mg. | Area of spread on— | | |
|---|---|---|---|---|
| | | cotton, sq. in. | beans, sq. in. | Kalanchöe, sq. in. |
| Soltrol-140 | 3.1 | 1.25 | [1].40 | 1.49 |
| Diisopropyl heavy ends | 2.8 | 1.0 | [1].35 | .31 |
| HF heavy alkylate | 3.9 | .9 | [1].59 | 1.24 |
| No. 1 fuel oil | 3.8 | .02 | .12 | .03 |
| Diesel fuel | 3.7 | .02 | .03 | .02 |
| Recycle gas oil | 2.5 | .02 | .03 | .08 |

[1] Because of the pubescence on bean leaves the apparent area of spread is less since each hair is wetted by the oil.

Results of the tests show that all of the isoparaffinic hydrocarbons have much greater spreading power than No. 1 fuel oil, diesel fuel or recycle gas oil.

EXAMPLE III

Spreading properties of mixtures of normal paraffins and isoparaffins were determined on cotton leaves to further demonstrate the spreading power of isoparaffins. Cetane and Soltrol 140 were mixed in various proportions and spreading determined on the mixtures. Results are recorded in the following table.

Table III

| Composition of oil | | Spread of a 3.5 mg. drop on Cotton Leaves, sq. in. |
|---|---|---|
| Percent Soltrol-140 | Percent Cetane (n-hexadecane) | |
| 100 | 0 | 1.2 |
| 75 | 25 | .73 |
| 50 | 50 | .49 |
| 25 | 75 | .21 |
| 0 | 100 | .02 |

The results show that isoparaffinic hydrocarbons have greater spreading power than mixtures containing substantial amounts of n-paraffins or than n-paraffins per se.

EXAMPLE IV

Tests were run to compare the spreading properties of diesel fuel with the same material containing added wetting agent. Results are recorded in the following table.

| Oil | Wetting Agent | Amount of Wetting Agent, percent by weight | Spread of a 3.7 mg. drop on cotton leaves, sq. in. |
|---|---|---|---|
| Diesel fuel | Triton X 100 (alkylated aryl polyether alcohol) | 2 | 0.02 |
| Do | Span 80 (Sorbitan monooleate) | 2 | 0.02 |
| Do | None | None | 0.02 |

These tests show that the spreading of a typical diesel fuel on cotton leaves is not increased by the addition thereto of wetting agents.

EXAMPLE V

Defoliation tests were made on cotton using tert-butylsulfenyl-tert-butyl trithiocarbonate at 0.25 mg. per leaf using Soltrol 140 and diesel fuel as carriers. 0.5 weight per cent solutions were used in all of the tests. Results of the tests are recorded in the following table.

| Solute | Carrier | Amount solute per leaf | Percent defoliation at end of observation period |
|---|---|---|---|
| tert-butysulfenyl-tert-butyl trithiocarbonate | Soltrol 140 | 0.25 mg. (0.05 cc. containing 0.5% trithiocarbonate) | 100% in 3 days. |
| None | do | None | None. |
| tert-butysulfenyl-tert-butyl trithiocarbonate | diesel fuel | 0.25 mg. (0.05 cc. containing 0.5% trithiocarbonate) | 75% in 6 days; no further defoliation at end of 12 days. |

EXAMPLE VI

Field defoliation tests were made on cotton using tert-butylsulfenyl-tert-butyl trithiocarbonate dissolved in an HF heavy alkylate boiling in the range 390° to 600° F. containing a minimum of 98% isoparaffins by weight and in diesel fuel. Application of a 1 per cent solution was made at a rate of 5 pounds of trithiocarbonate per acre. Results are recorded in the following table.

| Solute | Amount solute per acre, pounds | Carrier | Defoliation at at end of observation period |
|---|---|---|---|
| tert-butylsulfenyl-tert-butyl trithiocarbonate | 5 | HF heavy alkylate | 94% in 7 days. |
| None | None | do | 5% in 7 days. |
| tert-butylsulfenyl-tert-butyl trithiocarbonate | 5 | diesel fuel | 70% in 7 days |

The results of the field defoliation tests on cotton show that the use of an isoparaffinic hydrocarbon carrier provides a 22% increase in defoliation over the same amount of active defoliating agent applied in diesel fuel.

In Examples V and VI the improvement in the high defoliation ranges is very significant and determines the difference between a good and a poor defoliant.

EXAMPLE VII

Proceeding according to this invention employing four pounds of tertiary butyl polysulfide in eight gallons of HF heavy alkylate per acre, up to 89 per cent defoliation of cotton was obtained. Applications were made with a tractor sprayer and good coverage was obtained.

Small scale tests were made at two different locations using four pounds of tertiary butyl polysulfide per acre applied as a one per cent solution in HF heavy alkylate. In one location said polysulfide gave up to 81 per cent defoliation of cotton and in the other location up to 93 per cent defoliation. These tests which were effected in the field show the particular excellency of the spreading power of applicant's isoparaffins employing rather low or small quantities of the substance which affects the plants.

In application Serial Number 153,994, filed April 4, 1950, by the present inventors there is described and claimed a method of defoliating a plant which comprises applying to said plant an organic sulfide and a plant defoliating composition consisting essentially of such a sulfide and a suitable carrier.

In application Serial Number 157,402, filed April 21, 1950, now U. S. Patent 2,607,673 (August 19, 1952), by the present inventors there is described and claimed a method of defoliating a plant employing a compound selected from the group of sulfenyl and thiosulfenyl trithiocarbonates which can be represented by the general formula

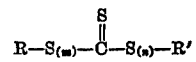

wherein R and R' are organic radicals from the class of alkyl, cycloalkyl, aryl, alkaryl and aralkyl groups; $m$ is an integer from the group of 1, 2 and 3; $n$ is an integer from the group of 2 and 3, and R and R' can be different. A plant defoliating composition containing one of the compounds which can be represented by the said general formula as an essential ingredient thereof is also claimed in the said last mentioned application for patent.

Serial Number 165,122, also filed by the present inventors, May 29, 1950, describes and claims a method of defoliating a plant by applying a bis (alkylmercaptothiocarbonyl) disulfide having a composition in accordance with the structural formula:

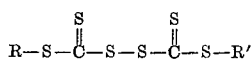

wherein R and R' are alkyl radicals containing from 1 to 12 carbon atoms and wherein said R and R' can be different. A plant defoliating composition comprising the said disulfide as an effective ingredient is also there set forth. It is within the scope of this invention to prepare and to use for defoliating a plant, a plant defoliating composition comprising the said bis (alkylmercaptothiocarbonyl) disulfide as an effective ingredient dissolved in the highly branched isoparaffin hydrocarbon of this invention.

Reasonable variation and modification are possible within the scope of the foregoing disclosure and the appended claims to the invention the essence of which is that we have discovered that certain isoparaffinic hydrocarbons, particularly highly-branched isoparaffinic hydrocarbon containing 9 to 20 carbon atoms of which at least 2 are tertiary or quaternary carbon atoms and boiling within the range 260° to 800° F. have excellent spreading properties upon plants and that when substances affecting plants are dissolved in said hydrocarbons excellent results are obtained.

We claim:

1. A novel composition of matter comprising an isoparaffinic hydrocarbon containing therein at least one defoliating compound selected from the group consisting of organic sulfides, sulfenyl trithiocarbonates, thiosulfenyl trithiocarbonates, and bis (alkylmercaptothiocarbonyl) disulfides having defoliating activity, said compound being present in a quantity sufficient to effect defoliation, said hydrocarbon containing from 9 to 20 carbon atoms, of which at least 2 are one of a tertiary and a quaternary carbon atom, and boiling in the range 260° to 800° F. and said hydrocarbon containing not in excess of about two weight per cent of the hydrocarbon of cycloparaffins, aromatics and olefins, said hydrocarbon having the property of excellently spreading said compound upon said plant.

2. A composition according to claim 1 wherein said hydrocarbon is present in said composition as a fraction which boils within the range 260 to 700° F., contains at least 90 weight per cent of isoparaffins, and is substantially completely saturated.

3. A composition according to claim 1 wherein said defoliating compound is contained in an isoparaffinic hydrocarbon fraction which is derived from the alkylation of isobutane with mixed butenes in the presence of HF and which boils within the range 268 to 403° F.

4. A composition according to claim 1 wherein said defoliating compound is contained in an isoparaffinic hydrocarbon fraction which boils in the approximate range 324 to 637° F. and which is derived from the alkylation of isobutane with ethylene in the presence of aluminum chloride.

5. A composition according to claim 1 wherein the defoliating compound is contained in an isoparaffinic hydrocarbon fraction which boils in the approximate range 390 to 600° F. and which is derived from the alkylation of isobutane with ethylene in the presence of hydrogen fluoride.

6. A composition according to claim 1 wherein said hydrocarbon is 2,2,4,4-tetramethylpentane.

7. A composition according to claim 1 wherein said hydrocarbon is 2,3-dimethylheptane.

8. A composition according to claim 1 wherein said hydrocarbon is 2,4-dimethylheptane.

9. A composition according to claim 1 wherein said hydrocarbon is 2,2,3-trimethylhexane.

10. A composition according to claim 1 wherein said hydrocarbon is 2,2,4-trimethylhexane.

11. A composition according to claim 1 wherein said defoliating compound is t-butyl polysulfide and said hydrocarbon is present as an HF heavy alkylate.

12. A method of defoliating a plant which comprises applying thereto, in an amount sufficient to cause defoliation thereof, a composition according to claim 1.

13. As a novel plant defoliating composition a quantity of tert-butylsulfenyl-tert-butyl trithiocarbonate, sufficient to substantially completely defoliate a plant, dissolved in an isoparaffinic hydrocarbon fraction boiling in the approximate range 368° to 403° F. derived from the alkylation of isobutane with mixed butenes in the presence of HF.

14. As a novel plant defoliating composition a quantity of teret-butylsulfenyl-tert-butyl trithiocarbonate, sufficient when properly distributed to substantially completely defoliate a plant, dissolved in an HF heavy alkylate boiling in the approximate range 390° to 600° F., containing a minimum of 98% isoparaffinic hydrocarbons.

15. A method of defoliating cotton which comprises applying thereto, in a quantity sufficient to cause defoliation of said cotton, a defoliating agent dissolved in a highly-branched isoparaffinic hydrocarbon having 9 to 20 carbon atoms per molecule at least 2 of which are one of a tertiary and a quaternary carbon atom, the said hydrocarbon boiling in the range 260° to 800° F.

16. A method according to claim 15 wherein the agent is tert-butylsulfenyl-tert-butyl trithiocarbonate.

17. A method for defoliating cotton which comprises applying thereto, in a quantity sufficient to cause defoliation of said cotton, tert-butyl polysulfide dissolved in a highly-branched isoparaffinic hydrocarbon having 9 to 20 carbon atoms per molecule at least 2 of which are one of a tertiary and a quaternary carbon atom, the said hydrocarbon boiling in the range 260° to 800° F.

References Cited in the file of this patent

UNITED STATES PATENTS

| Number | Name | Date |
|---|---|---|
| 2,174,883 | Ipatieff et al. | Oct. 3, 1939 |
| 2,267,730 | Grosse et al. | Dec. 30, 1941 |
| 2,502,366 | Beman et al. | Mar. 28, 1950 |
| 2,509,233 | Kaberg et al. | May 30, 1950 |
| 2,512,044 | Swaney | June 20, 1950 |
| 2,558,762 | Kohr | July 3, 1951 |
| 2,697,673 | Goodhue | Aug. 19, 1952 |

OTHER REFERENCES

California Dept. Agriculture Bull., vol. 35, No. 1, January-March 1946, pages 49 to 54.

Agricultural Chemicals, April 1950, pages 31–34, 99 and 101.

J. Economic Entomology, April 1949 (vol. 42), pages 387–391.

Richmond News Leader, Friday, November 3, 1944, page 7, col. 1.